United States Patent
Tramontano (10) Patent No.: US 6,575,359 B1
(45) Date of Patent: Jun. 10, 2003

(54) SYSTEM OF AUTOMATED TELLER MACHINES

(75) Inventor: Robert J. Tramontano, Bucks (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/286,541

(22) Filed: Apr. 5, 1999

(51) Int. Cl.[7] .............................................. G06K 5/00
(52) U.S. Cl. ........................ 235/380; 235/379; 703/35
(58) Field of Search ................................ 235/380, 379; 705/35

(56) References Cited

U.S. PATENT DOCUMENTS

| | | | | |
|---|---|---|---|---|
| 5,524,073 A | * | 6/1996 | Stambler | 705/75 |
| 5,557,516 A | * | 9/1996 | Hogan | 235/380 |
| 5,677,955 A | * | 10/1997 | Doggett et al. | 235/379 |
| 5,699,528 A | * | 12/1997 | Hogan | 395/240 |
| 5,729,594 A | * | 3/1998 | Klingman | 379/93.12 |
| 5,870,456 A | * | 2/1999 | Rogers | 379/91.01 |
| 5,890,140 A | * | 3/1999 | Clark et al. | 705/35 |
| 6,085,177 A | * | 7/2000 | Semple et al. | 705/43 |
| 6,098,053 A | * | 8/2000 | Slater | 705/44 |
| 6,149,057 A | * | 11/2000 | Hollis | 235/379 |
| 6,414,958 B1 | * | 7/2002 | Specht | 370/395.53 |

FOREIGN PATENT DOCUMENTS

JP    409185752 A  *  7/1997

* cited by examiner

Primary Examiner—Michael G. Lee
Assistant Examiner—Allyson Sanders
(74) Attorney, Agent, or Firm—Gregory A. Welte (57) ABSTRACT

A system of Automated Teller Machines (ATMs). When a customer of an ATM requests a disbursement of cash, such as one hundred dollars, the ATM contacts an intermediary agent, who sends a message to the customer's bank over the INTERNET, requesting approval. When approval is authorized, the customer's bank sends an approval-message to the intermediary-agent, who relays it to the ATM, which then dispenses the cash. The intermediary agent then (1) credits amounts to both itself and the ATM (or its owner), for services rendered, such as one dollar each, (2) debits the customer's bank, for $ 102 in this example, (3) credits the ATM (or its owner), for $ 101 in this example, (4) keeps one dollar for itself, and (5) periodically collects the actual amounts and physically distributes them, to satisfy the debits and credits.

5 Claims, 9 Drawing Sheets

SYSTEM OF AUTOMATED TELLER MACHINES

The invention concerns a system wherein inexpensive public-access networks are used in ATM transactions.

BACKGROUND OF THE INVENTION

Automated Teller Machines (ATMs) are in widespread usage. ATMs rely on internal computers, and vast advances have been made in computers since the introduction of the ATM.

In addition, in virtually every transaction, an ATM is required to communicate with some other party, such as the financial institution which maintains the ATM. Great advances have been made in the communication arts since the introduction of the ATM.

The invention proposes to improve operation of ATMs by applying these types of advancements to the operation of ATM systems.

OBJECTS OF THE INVENTION

An object of the invention is to provide an improved system of ATMs.

A further object of the invention is to provide a system of ATMs which implement novel communication modes.

SUMMARY OF THE INVENTION

In one form of the invention, an ATM calls a reverse-toll telephone number, such as a so-called "900 number," to obtain approval of a cash disbursement requested by a customer. (Alternatively, the ATM may call a network access address.) The party maintaining the reverse-toll number obtains approval from the customer's bank, and informs the ATM whether approval was granted. The party may use the INTERNET for these purposes, or any other suitable network. After the ATM dispenses the cash, the party adds the amount of the cash to the bank's telephone bill, and remits that amount to the ATM, or its owner. The party may also add service charges, and divide them between itself, the ATM operator, and the ATM owner (if different from the operator), as appropriate.

DETAILED DESCRIPTION OF THE INVENTION

A typical ATM transaction can be divided into two components: cash disbursement and settlement.

Cash Disbursement

Figure 1:
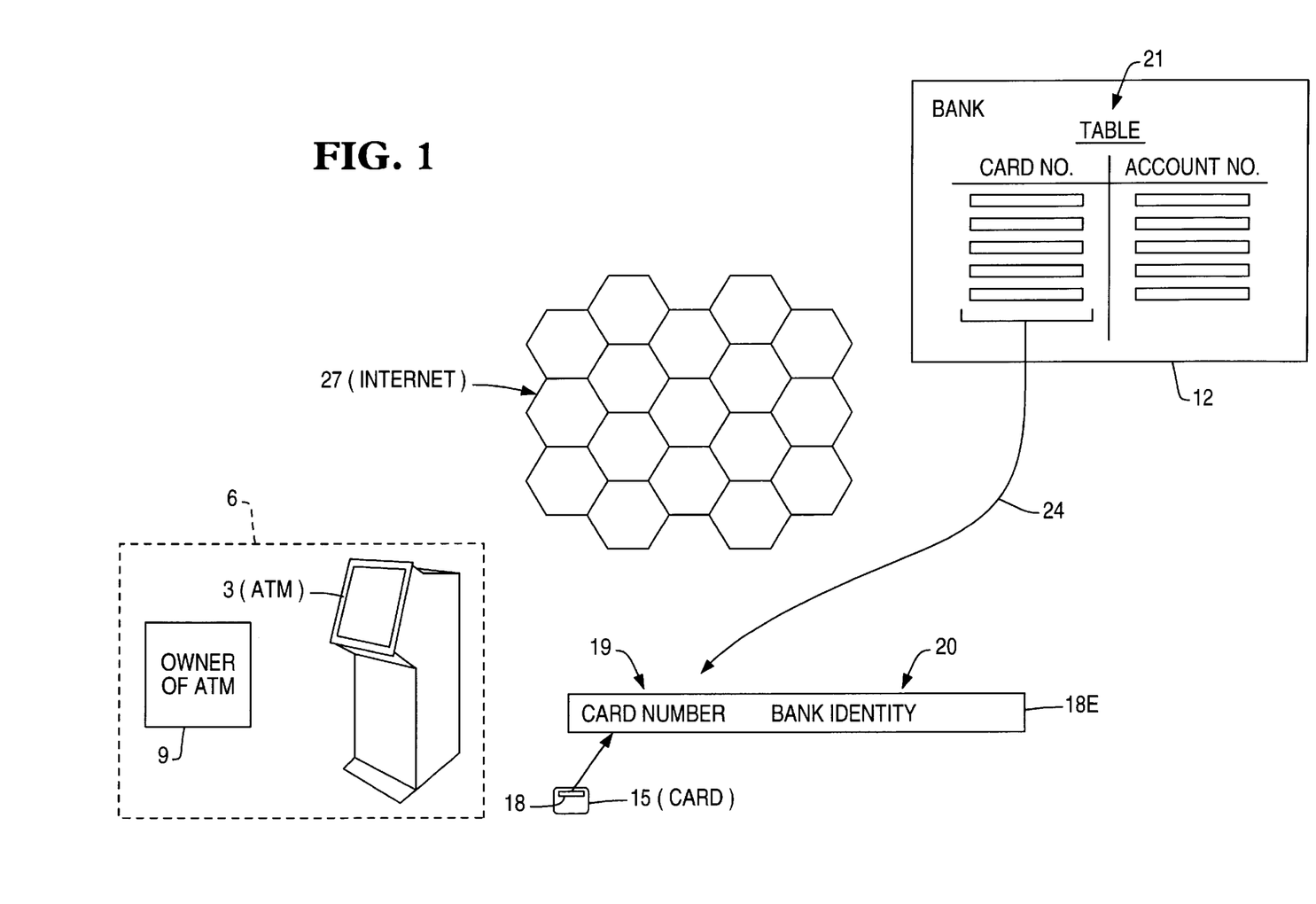
FIG. 1 illustrates components involved in one form of the invention.

FIG. 1 illustrates the basic components involved in operation of one form of the invention. The Figure shows an ATM 3, its owner 9, and a dashed box 6 associating the two together. In many cases, the owner 9 is a financial institution.

A bank 12 is also shown, and represents another, generalized, financial institution. In some cases, bank 12 and owner 9 will be the same entity. However, in the general case, these two entities will be different, and so FIG. 1 illustrates them as distinct.

A standard access card 15, such as a standard passcard, is used by a customer (not shown) to log in to the ATM. The card 15 contains a magnetic stripe 18, called a magstripe in the art, or contains another machine-readable type of data memory, such as that found in so-called "smart cards." The magstripe 18, shown in enlarged form as block 18E, contains a number 19 which identifies the card 15, and also indicia 20 which identifies the bank 12 which issued the card 15.

Within the bank 12 is shown a table 21, which associates one or more account numbers with each card number. The card numbers refer to the number of each card 15, as indicated by arrow 24. Through the bank's use of the table 21, the card 15 need carry no data indicating an account number. Thus, loss or theft of the card 15 reveals no account number to any party in possession of the card. The card 15 merely carries the card number 19, which is a type of serial number.

FIG. 1 also shows a public-access, packet-switched network 27, such as the INTERNET.

Figure 2:
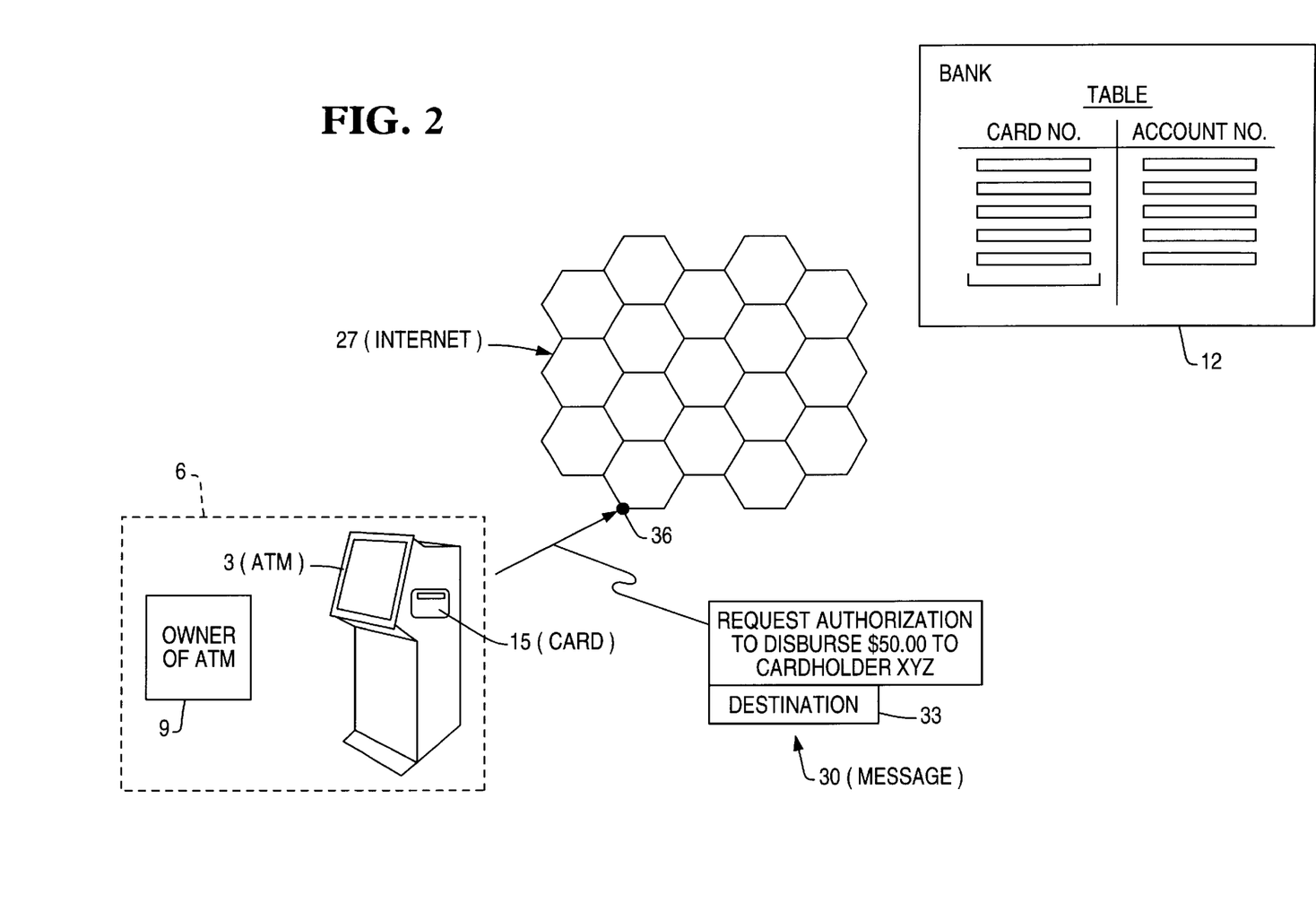
FIGS. 2–6 illustrate actions undertaken by one form of the invention.

Assume that a customer (not shown) wishes to withdraw fifty dollars ($50.00) from the ATM. The customer would present the card 15 to the ATM, as indicated in FIG. 2, and log in to the ATM, in the customary manner. The ATM obtains access to the data stored on the magstripe 18.

The ATM delivers a message 30 to the network 27. That message takes the form of one, or more, data packets. The message 30 contains a field 33 which indicates the intended destination of the message. This destination is bank 12.

In general, the message is encrypted. The type of encryption depends on various factors, including the country of the world in which the ATM 3 resides. Encryption in general, and encryption of ATM communications in particular, is known in the art.

Figure 3:
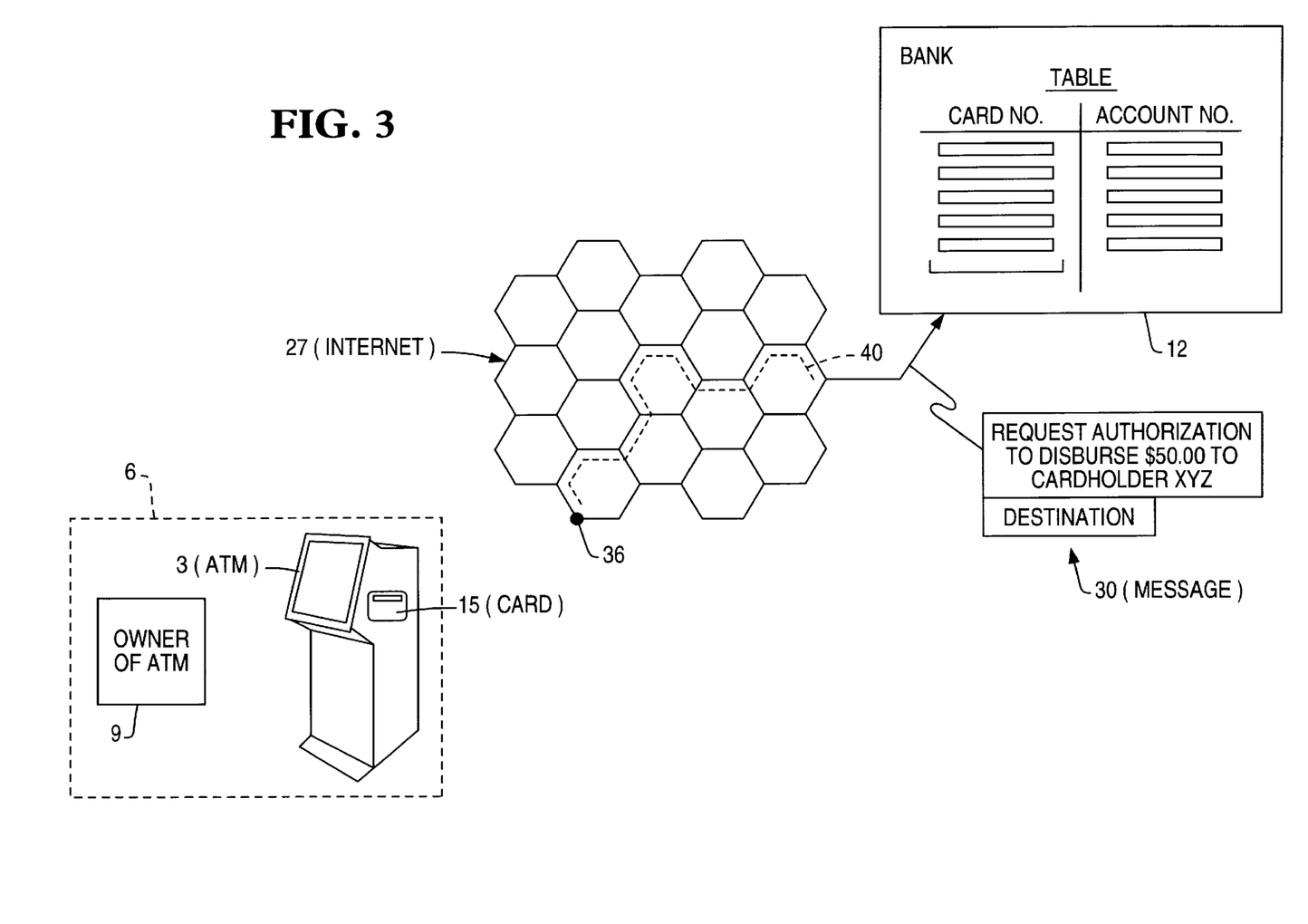

The message is delivered to a particular computer of the network 27, indicated by dot 36. That computer 36 reads the destination 33, selects another computer as a relay point, and delivers the message 30 to the relay point. The relay point repeats these actions, and the message 30 is successively passed along a route, such as the route 40 shown in FIG. 3, until it reaches its destination, namely, bank 12.

Figure 4:
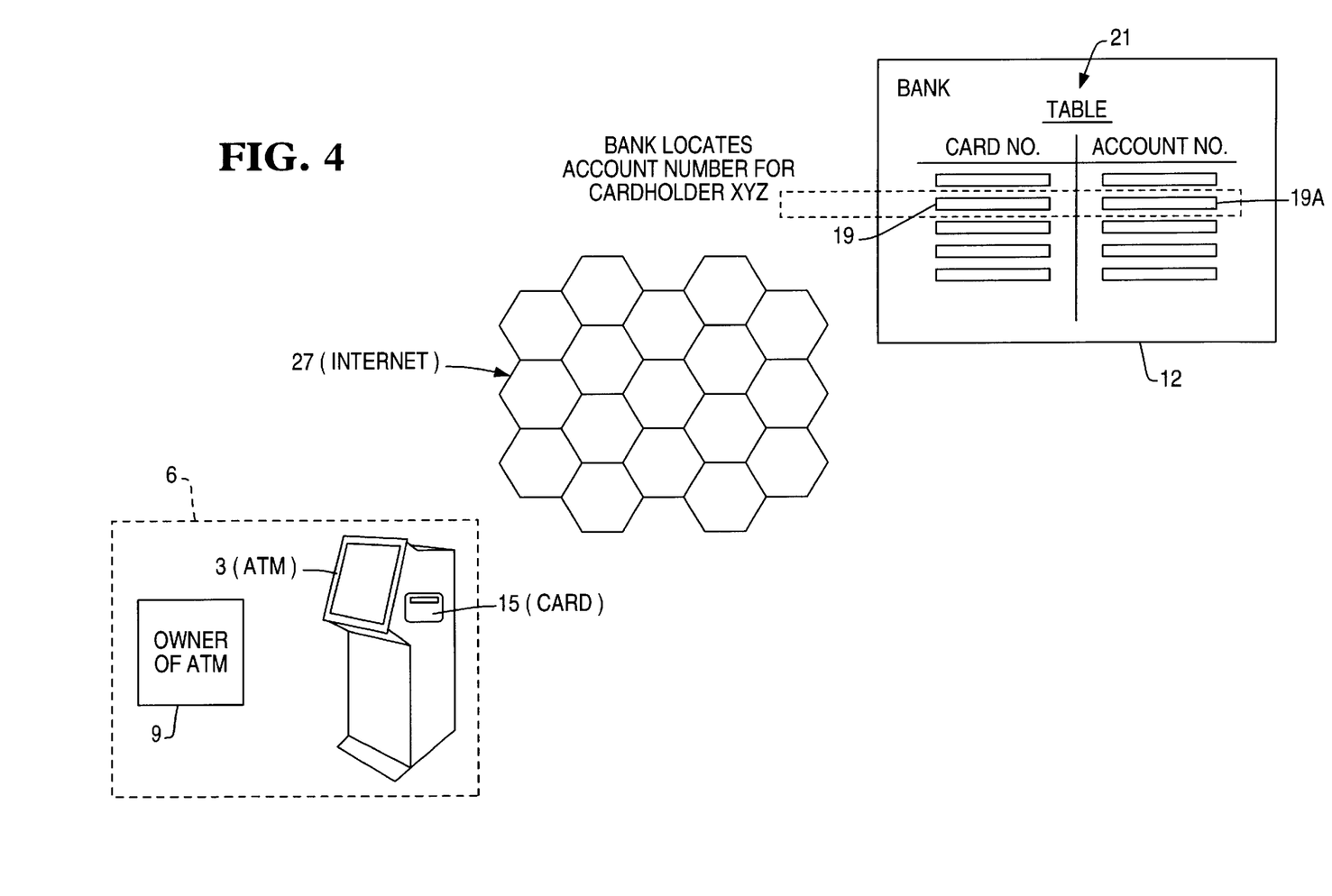

The message includes the number 19 of card 15 in FIG. 1. The bank 12 in FIG. 4 utilizes this number 19 to locate the account number 19A, which is associated with the number 19. Having located the account number 19A, the bank examines the account, to ascertain whether disbursal of the requested fifty dollars is appropriate.

Figure 5:
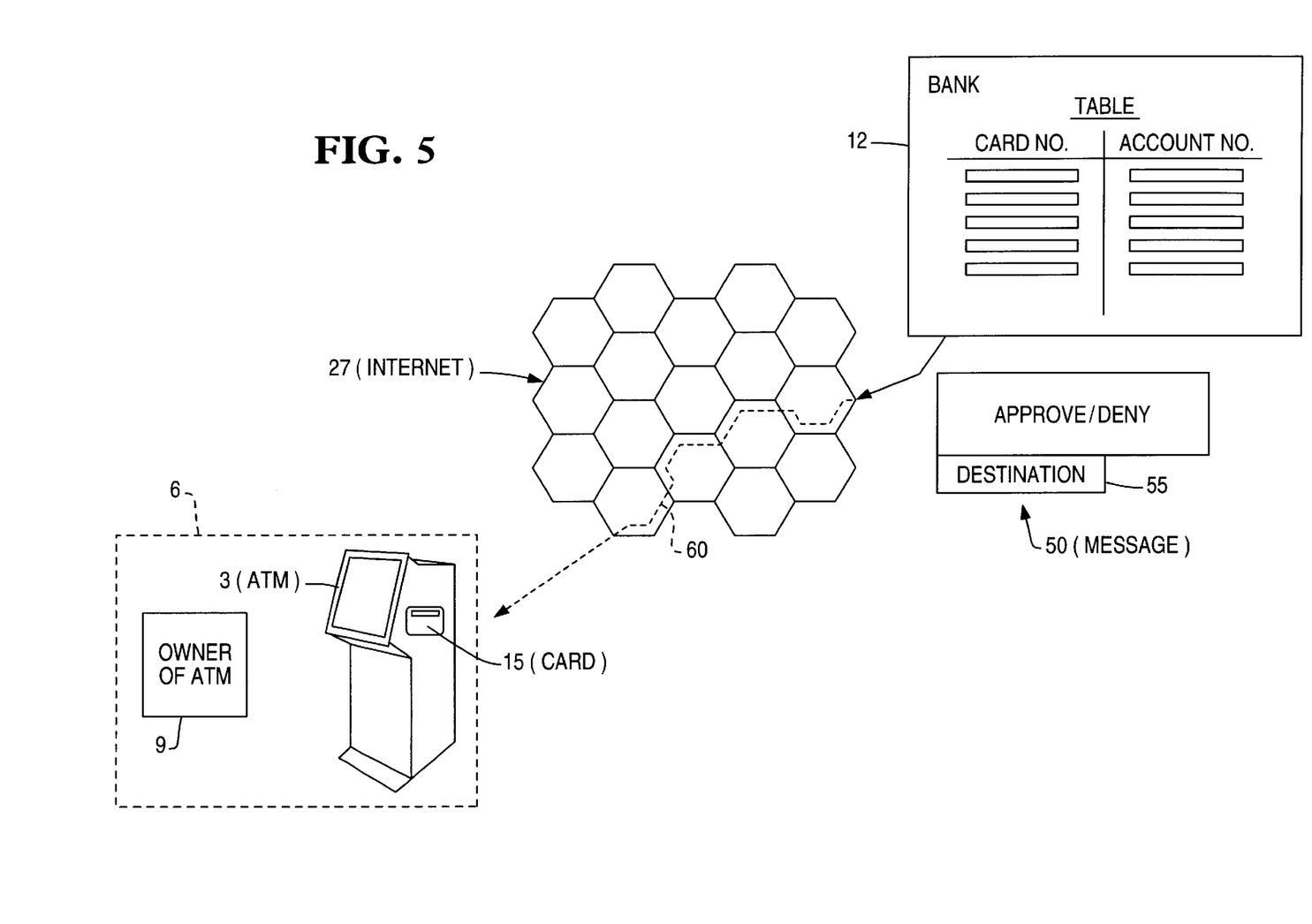

When the bank 12 determines whether to approve or deny the disbursal, it generates a message 50 in FIG. 5, and delivers it to the network 27. The destination field 55 of the message 50 designates the ATM as the recipient. The computers within the network 27 route the message to the ATM, as along path 60. Upon receiving the message, the ATM either disburses the money to the customer, or withholds disbursement, as the message 50 directs.

The ATM then terminates the transaction with the customer, in the usual manner.

The Inventor points out that the discussion given above contains a small simplification, which was made for ease of explanation. The simplification is that, in general, the ATM 3 does not contact the network directly, nor does the bank 12. One reason is that special data transmission techniques are required to contact the network, and these entities are not, in general, capable of executing these techniques.

Figure 7:
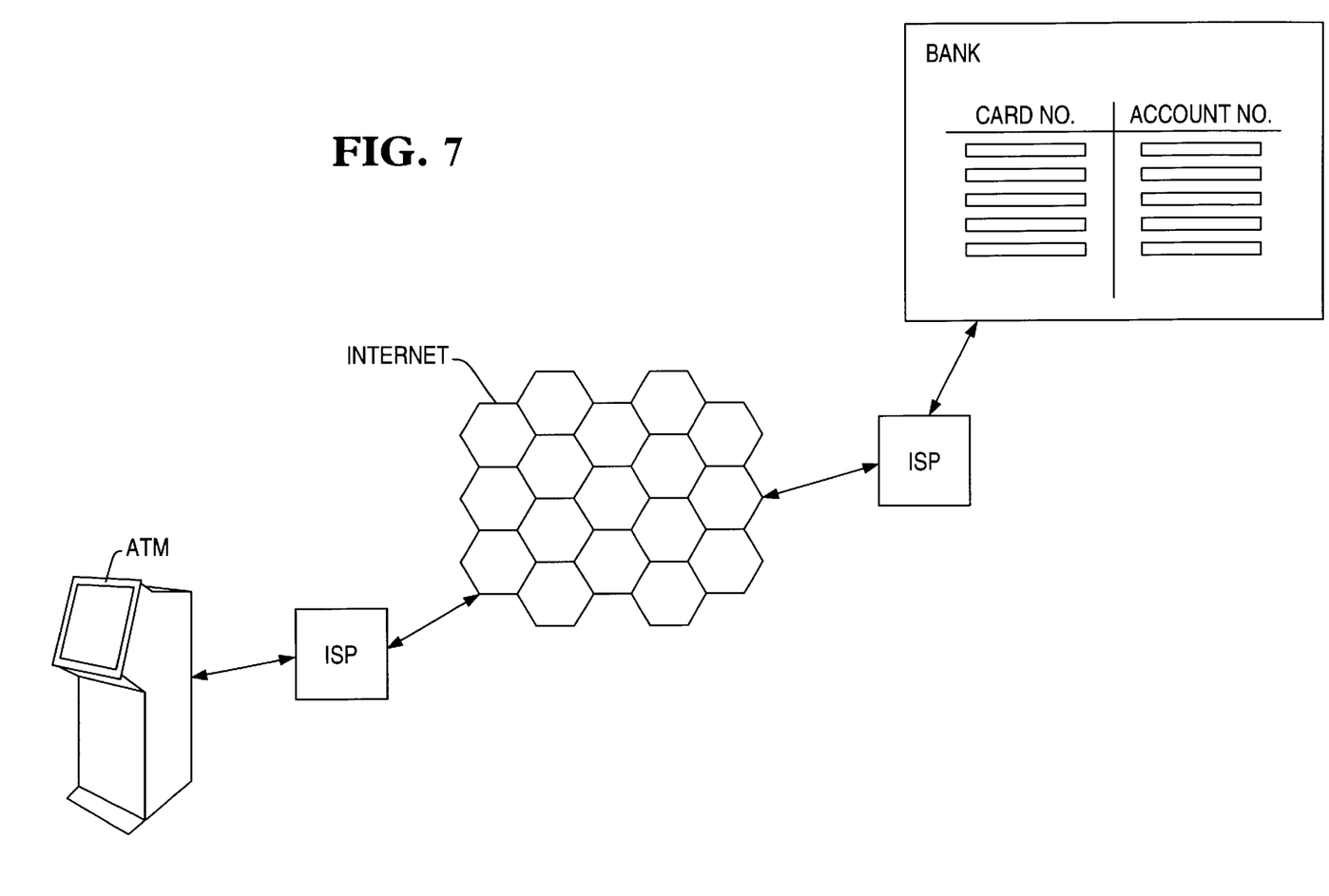
FIG. 7 illustrates how both the ATM 3 and the bank 12 each communicate with a respective ISP, Internet Service Provider.

Instead, the ATM 3 and the bank 12 most likely transmit their messages to, and receive them from, Internet Service Providers, ISPs. Alternatively, ATM switch providers, such as the Cirrus Network and the PLUS Network, may transmit these messages. FIG. 7 illustrates two ISPs acting as intermediaries. The messages described above can take the form of "electronic mail" messages, which are handled by the ISPs. In the more general case, the messages are transferred using a message-transfer protocol which differs from electronic mail protocols in several respects. Both protocols are known in the art.

It is not strictly necessary that the parties (bank 12 and ATM 3) utilize ISPs. The parties may acquire the necessary equipment, and act as their own ISPs.

Therefore, an ATM transmits a message to a bank, over a packet-switched network, which may be public-access or private-access, requesting approval to dispense currency. The bank responds, over the same network, and either grants, or withholds, approval.

Settlement

A second stage of the transaction must now be undertaken, which is termed "settlement." When the ATM disburses money, such as the requested fifty dollars, the wealth of the owner 9 of the ATM has now been reduced by that amount. Of course, if the owner 9 and the bank 12 are the same entity, that reduction is handled by deducting fifty dollars from the customer's account, which is the account bearing number 19A in FIG. 4.

Figure 6:
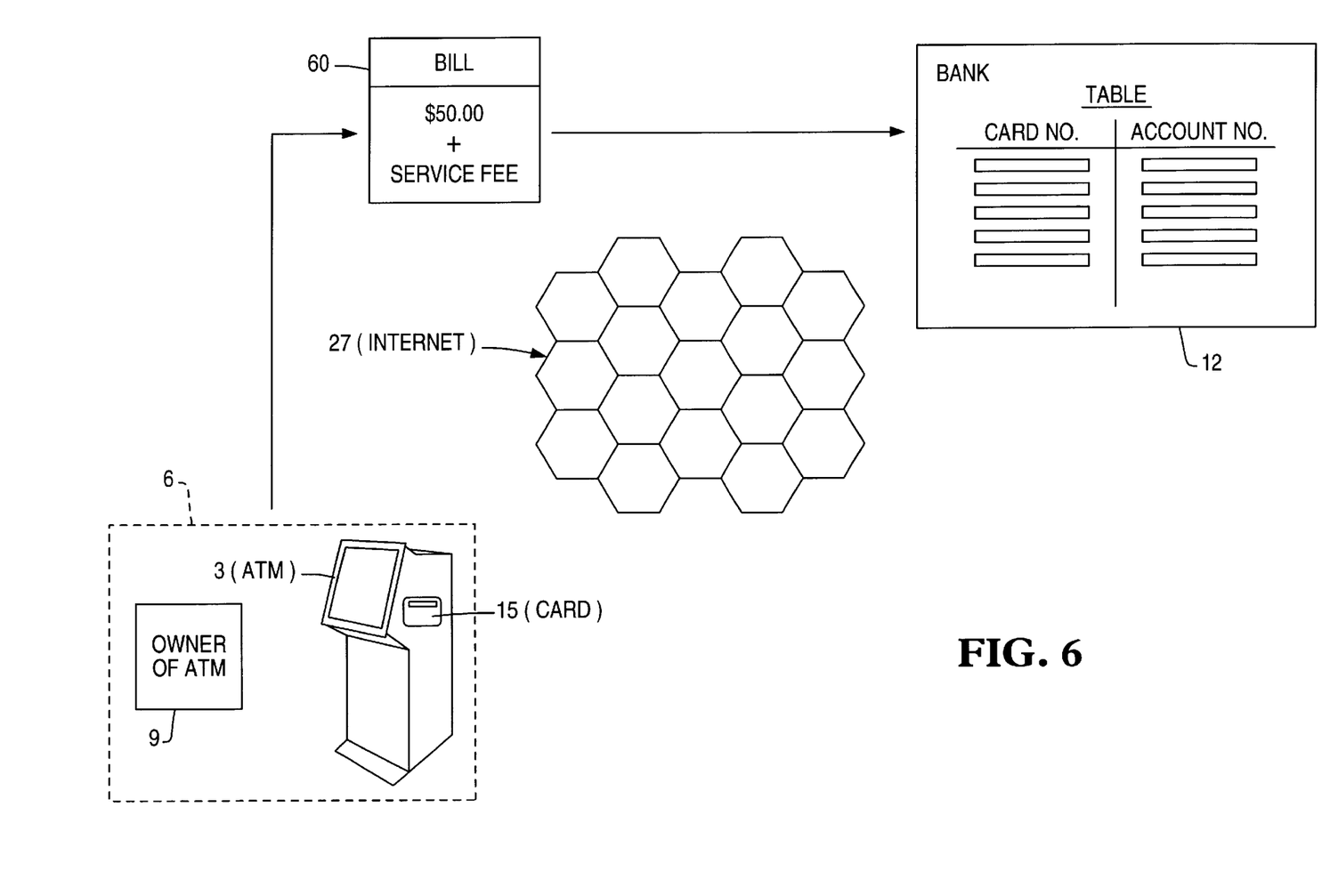

However, in the general case, the owner 9 and the bank 12 will be different entities. Therefore, the owner 9 must recover the fifty dollars from the bank 12. One approach is for the owner 9 to send a bill 60 in FIG. 6 to the bank 12. This bill 60 can be transmitted through the network 27, like the messages 30 and 50 described above, or delivered in any appropriate manner, such as by a postal service. The bill 60 will also charge the bank 12 a service fee, as indicated in FIG. 6, for the usage of the ATM.

In one form of the invention, a party which is completely unrelated to the transaction handles the settlement. As background to this form of the invention, the Inventor points out that services exist which collect money from telephone callers, in the form of a charge added to the caller's telephone bill. These services deliver the money to another party, such as the party called.

For example, an educational television station may broadcast a television program which solicits contributions from the viewing audience. The program may encourage viewers to place a telephone call to a specific telephone number, such as one bearing a prefix of "900." When a viewer places a call, the viewer is asked general questions about the viewer's opinion of the television station, in order to allow the viewer to give feedback to the station. In addition, the mere act of placing the call causes an amount of money to be added to the viewer's monthly telephone bill. This amount is given to the television station as a contribution. Thus, by placing a telephone call, the caller generates a payment to the television station.

A telephone service provider handles the collection, and payment, of this money. That is, a telephone company acts as collection agent for the money, and as remittance agent for delivering it to the television station, in addition to providing part, or all, of the communication service which facilitates the customer feedback. A likely arrangement would (1) The telephone service provider remits the money to the television station as soon as the call is placed, or soon thereafter. This remission takes the form of a direct payment, or a credit to an account between the provider and the station.

(2) The telephone service provider deducts a fee from the payment for its services of money collection, money remission, and handling the calls.

(3) The telephone service provider collects the amounts from the telephone subscribers who called the "900" number.

Figure 8:
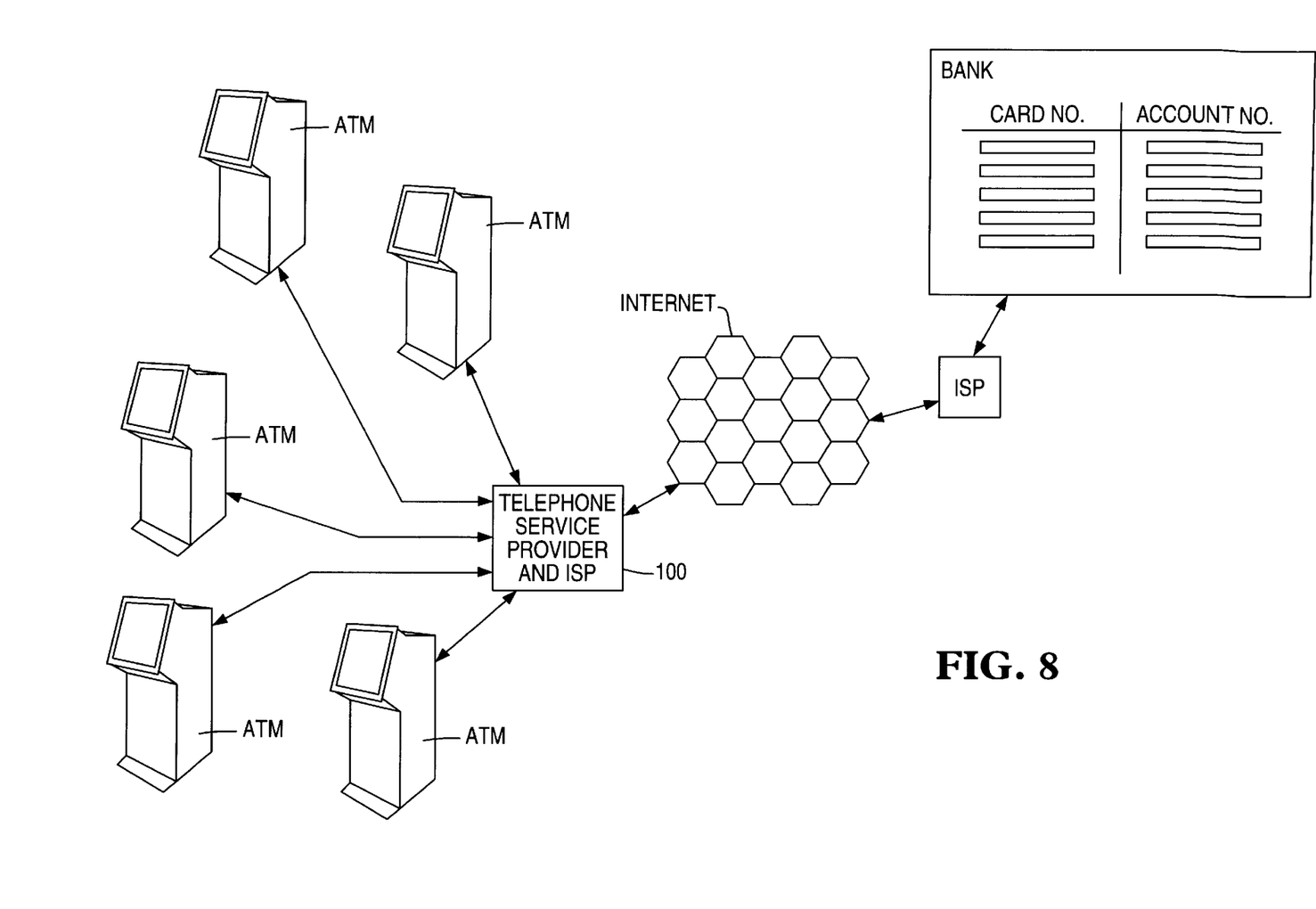
FIG. 8 illustrates one form of the invention.

A similar approach can be undertaken by the invention. FIG. 8 illustrates one arrangement, which shows multiple ATMs. These may be under common ownership, different ownership, or any combination of ownership. When an ATM wishes to disburse money to a customer, it sends a message to the bank identified on the card of the customer requesting the money, as described above in connection with FIG. 2.

The ATM delivers this message by dialing the agent 100 in FIG. 8, and delivering a message intended for the customer's bank 12. The agent 100 relays the message to the bank 12. When the bank 12 sends a reply, it replies to the agent 100, which relays the reply to the ATM.

In addition, the agent 100 is informed of any disbursements made by the ATM to the customer. When a disbursement occurs, the agent 100 debits an account of bank 12, and credits an account of the owner (not shown) of the ATM. Periodically, the agent 100, bank 12, and the owner undertake cash settlements, wherein payments are made to the appropriate parties to settle the accounts. Periodically does not necessarily mean at fixed intervals. But, at the time of the ATM transaction, no payments are made; the agent 100 merely updates the accounts of the parties. The only cash payment is that from the ATM to the customer.

The agent 100 can take the form of a telephone service provider, a long distance calling provider, or a separate entity entirely.

Flow Chart

Figure 9:
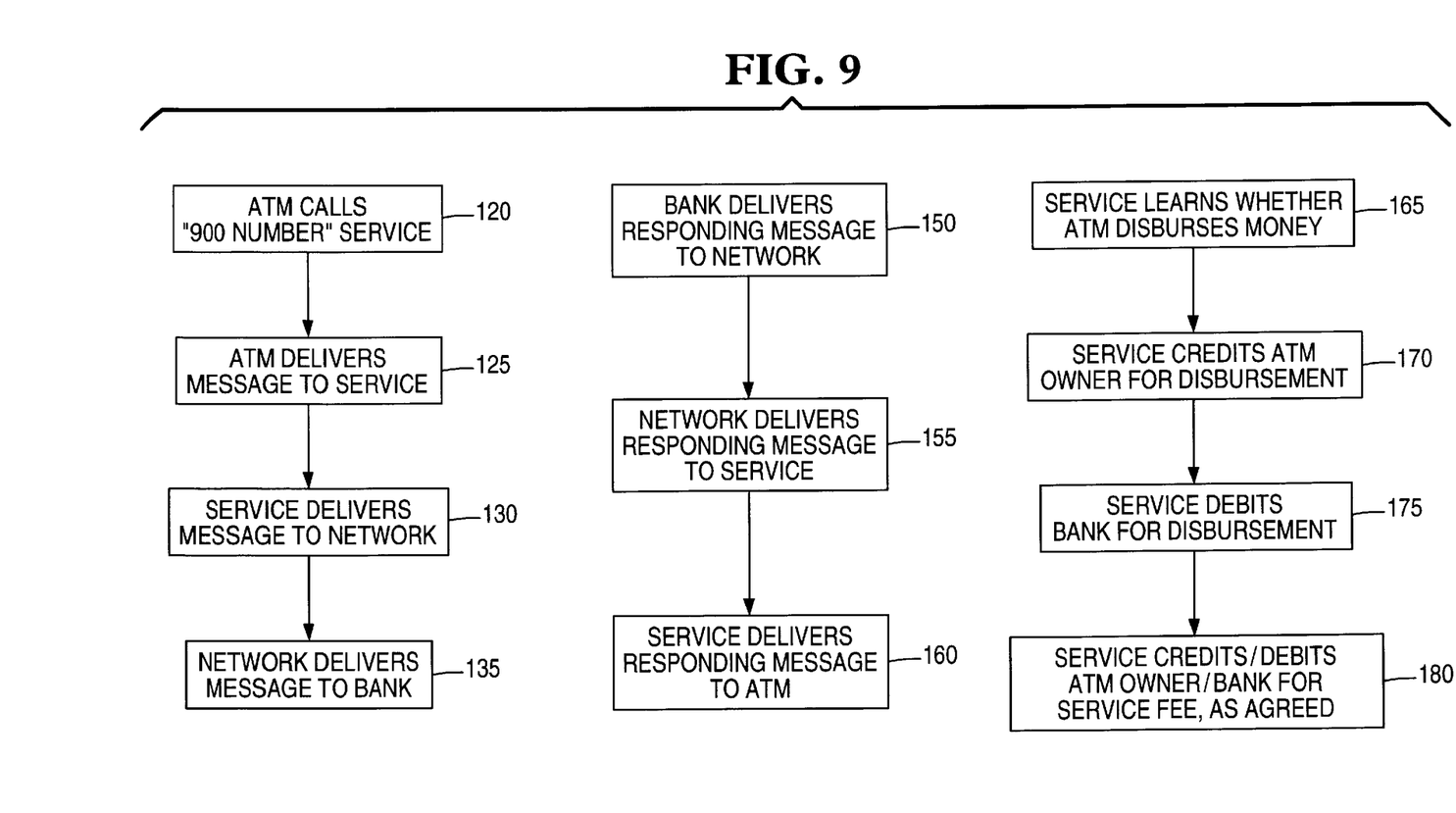
FIG. 9 is a flow chart illustrating logic implemented by one form of the invention.

FIG. 9 is a flow chart illustrating logic undertaken by one form of the invention. In block 120, in response to a customer's request for a disbursement, an ATM calls a "900 number" service, which reaches the agent 100 in FIG. 8. In block 125, the ATM delivers a message to the agent, with the customer's bank listed as the destination, analogous to message 30 in FIG. 2.

In block 130 in FIG. 9, the agent 100 delivers the message to the network, and the network relays the message to the customer's bank, as indicated by block 135.

In block 150, the bank delivers a responding message to the network, which is destined for the agent 100. This message is analogous to message 50 in FIG. 5. In block 155 in FIG. 8, the network relays the message to the agent 100, which delivers the message to the ATM in block 160. The latter delivery enables the ATM to determine whether to disburse money to the customer.

In addition, in block 165, the agent 100 ascertains whether a disbursement occurs. This can be accomplished by monitoring the messages which it relays, by explicit messages received from one of the parties, as by a message from an ATM stating, in effect, "Disbursal of fifty dollars on X date to customer Z," or by other means.

If a disbursement occurs, then, in block 170, the agent credits the owner of the ATM for the disbursement, and, in block 175, debits the customer's bank. (Of course, if the owner and the bank are identical parties, the credit cancels the debit, except for the service fees of the agent.) In block 180, the agent allocates payments for services as agreed by the parties. For example, both the agent 100 and the owner of the ATM incur expenses in the cash disbursal: the owner must own and maintain the ATM, while the agent 100 incurs its own expenses, which may include the expense of maintaining telephone lines and switching equipment. Block 180 indicates that the agreed fees are credited and debited by the agent 100.

Additional Considerations

1. The network in FIG. 1 was identified as the INTERNET. In general, the network can take any form. Public-access packet-switched networks are specifically included, as well as private networks, and combinations of various networks, including public and private types.

2. Encryption was discussed above. Encryption implies a process wherein the frequency of occurrence of symbols in an original message (the "plain text") is altered in the encrypted message (the "cypher text"). If this alteration did not occur, then no actual encryption process occurs, because the cypher text can be cracked by simply tabulating the frequency of occurrence of characters.

Thus, a process such as encoding text into ASCII does not amount to encryption.

3. The invention allows an ATM to be located anywhere telephone service is available. Further, the invention allows an ATM to be located without regard to such availability, since cellular telephones, cellular modems, satellite connections, and other types of wireless communication can be used. These features are not available in prior-art ATM networks.

4. Applicant points out that, ordinarily, when a "900"-type telephone number is called, the caller incurs a charge. However, under the invention, an ATM places such a call. The ATM, through its owner, ultimately receives a payment because of the call, in the form of reimbursement of the cash dispensed by the ATM. This payment may be reduced by a fee for the "900" service, depending on the arrangement made by the parties involved.

5. Two types of message were discussed: (1) the request by the ATM for authorization of the transaction requested by the customer and (2) notification of the agent 100 by the ATM of the disbursal of money to the customer. One, or both, of these can be undertaken by direct communication between the parties, as by using a standard telephone line. Preferably, the messages are encrypted.

Numerous substitutions and modifications can be undertaken without departing from the true spirit and scope of the invention. What is desired to be secured by Letters Patent is the invention as defined in the following claims.

What is claimed is:

1. A method, comprising the following steps:
   a) receiving a telephone call from an ATM which is maintained by an owner;
   b) receiving, via the telephone call, a first message which identifies a financial institution as destination;
   c) delivering the first message to a packet-switched network, for delivery to the financial institution;
   d) receiving, from the network, a second message, which originated from the financial institution and identifies the ATM as destination;
   e) delivering the second message to the ATM, via a telephone call; and
   f) determining whether the ATM issued money to a customer and, if so,
      i) crediting an account of the owner by a first amount; and
      ii) debiting an account of the financial institution by a second amount.

2. Method according to claim 1, and further comprising steps of
   iii) collecting the second amount from the financial institution and
   iv) remitting the first amount to the owner.

3. A method of operating a system of ATMs, comprising the following steps:
   a) undertaking a transaction which comprises
      i) dispensing cash to a customer of an ATM, and
      ii) making a deduction from an account of the customer for the cash dispensed;
   b) settling the transaction by
      i) submitting a bill for telephone services to a party maintaining the account, and
      ii) including in the bill a charge for the cash dispensed.

4. A method associated with a system of ATMs, comprising the following steps:
   a) disbursing cash to customers of ATMs; and
   b) using telephone bills to charge parties in settlement of the disbursements.

5. Method according to claim 4, and further comprising the step of:
   c) using a public-access packet-switched network to carry message traffic between ATMs and financial institutions.

* * * * *